(12) United States Patent
Chungbin

(10) Patent No.: US 11,260,955 B2
(45) Date of Patent: Mar. 1, 2022

(54) APPARATUS AND METHOD OF PROVIDING A PRELOAD FOR THE ASSEMBLY OF LARGE STRUCTURES

(71) Applicant: The Boeing Company, Chicago, IL (US)

(72) Inventor: Jerry D. Chungbin, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 570 days.

(21) Appl. No.: 16/238,266

(22) Filed: Jan. 2, 2019

(65) Prior Publication Data

US 2020/0207456 A1 Jul. 2, 2020

(51) Int. Cl.
*B64C 3/26* (2006.01)
*F16B 1/00* (2006.01)
*B64F 5/10* (2017.01)

(52) U.S. Cl.
CPC .................. *B64C 3/26* (2013.01); *B64F 5/10* (2017.01); *F16B 1/0057* (2013.01)

(58) Field of Classification Search
None
See application file for complete search history.

(56) References Cited

U.S. PATENT DOCUMENTS

| | | | | |
|---|---|---|---|---|
| 1,403,444 | A * | 1/1922 | Rapp | B64C 3/00 244/123.8 |
| 2009/0320292 | A1* | 12/2009 | Brennan | B29D 99/0014 29/897.2 |
| 2012/0080135 | A1* | 4/2012 | Evens | B32B 37/10 156/94 |

* cited by examiner

*Primary Examiner* — Timothy D Collins
*Assistant Examiner* — Eric Acosta
(74) *Attorney, Agent, or Firm* — Quinn IP Law

(57) ABSTRACT

An apparatus and its method of use provide a preload to the assembly of large structures, for example the assembly of an aircraft wing panel to an aircraft wing frame. The apparatus and its method of use preloads the aircraft wing panel of the aircraft wing structure and presses the aircraft wing panel against the aircraft wing frame of the aircraft wing structure, temporarily securing the aircraft wing panel against the aircraft wing frame and indexing the aircraft wing panel to the aircraft wing frame for the installation of permanent fasteners securing the aircraft wing panel to the aircraft wing frame.

18 Claims, 4 Drawing Sheets

APPARATUS AND METHOD OF PROVIDING A PRELOAD FOR THE ASSEMBLY OF LARGE STRUCTURES

FIELD

This disclosure pertains to an apparatus and method of providing a preload for the assembly of large structures. More specifically, this disclosure pertains to an apparatus and its method of use that preloads a panel of a large structure and presses the panel against a frame of the structure, temporarily securing the panel against the frame and indexing the panel to the frame for the installation of fasteners securing the panel to the frame.

BACKGROUND

In the manufacture of large structures, for example the manufacture of an aircraft wing structure, temporary fasteners, for example, Cleco® type fasteners are used to temporarily fasten parts of the structure together before the parts are permanently joined. For example, in the manufacture of an aircraft wing structure where a skin panel or panel of material is to be secured to a frame of the wing, temporary fasteners are installed in holes pre-drilled through the panel and portions of the frame. The temporary fasteners clamp the panel to the frame and maintain the desired alignment of the panel and frame until permanent fasteners are installed securing the panel to the frame.

There are potentially thousands of temporary fasteners used to temporarily secure a wing panel to a frame to enable transport of the wing structure to different manufacturing locations. When the temporary fasteners are to be replaced with permanent fasteners, the temporary fasteners are removed from the holes drilled through the wing panel and frame for the temporary fasteners, and the holes through the wing panel and frame for the temporary fasteners are again drilled and cleaned to accommodate permanent fasteners being installed.

The use of temporary fasteners in the manufacture of large structures such as an aircraft wing structure results in extensive costs in the recurring labor involved in drilling holes through a wing panel and frame for the installation of temporary fasteners, the installation of the temporary fasteners in the drilled holes, the later removal of the temporary fasteners in preparation for installation of permanent fasteners, again drilling the holes previously prepared for the temporary fasteners in preparation for the installation of permanent fasteners in the drilled holes, and the installation of the permanent fasteners. Thus, the existing method of using temporary fasteners in the construction of large structures such as aircraft wing structures is time consuming, materials consuming, and labor consuming, which all add to the costs involved in the manufacture of such large structures.

SUMMARY

The apparatus and method of providing a preload for assembly of large structures of this disclosure eliminates the extensive costs, labor, and time associated with the installation, removal, and debris associated with using temporary fasteners in the manufacture of large structures, for example aircraft wing structures.

The apparatus is basically comprised of a bladder such as an air bladder, and a strap. The bladder can be constructed of any material that provides a sealed interior volume of the bladder. The strap can be constructed of any material that does not stretch when the material is subjected to tensile forces. The air bladder is secured to the strap.

The apparatus and its method of use are described herein as being used in preloading an aircraft wing panel for attachment of the panel to a frame, where the frame is comprised of a forward spar, a rearward spar, and a plurality of ribs of the frame that are attached between the forward spar of the frame and the rearward spar of the frame. The apparatus and its method of use could also be employed in pre-loading any type of panel for attachment of the panel to any type of frame, where the frame is comprised of a first longitudinal beam of the frame, a second longitudinal beam of the frame, and a plurality of lateral beams of the frame that are attached between the first longitudinal beam of the frame and the second longitudinal beam of the frame.

The strap has a forward end that is configured for removable attachment to a forward spar of the frame. The strap has a rearward end that is configured for removable attachment to a rearward spar of the frame. With the forward end of the strap attached to the forward spar of the frame and the rearward end of the strap attached to the rearward spar of the frame, the strap and the air bladder extend across the panel positioned on the plurality of ribs of the frame that are attached between the forward spar of the frame and the rearward spar of the frame with the air bladder engaging against the panel.

A pump communicates with the air bladder. When the forward end of the strap is attached to the forward spar of the frame and the rearward end of the strap is attached to the rearward spar of the frame, operation of the pump inflates the air bladder causing the air bladder to expand between the strap and the panel and causing the air bladder to exert a load on the panel which causes the panel to exert a load on the plurality of ribs of the frame.

A tension device having a length between a forward end of the tension device and a rearward end of the tension device is connected between the forward end of the strap and the rearward end of the strap. The tension device is operable to selectively reduce the length of the tension device causing the tension device to exert a tensile force between the forward end of the strap and the rearward end of the strap. The tensile force urges the strap against the air bladder and urges the air bladder against the panel.

The above described air bladder and strap is one combination of the air bladder and strap of a plurality of combinations of the air bladders and straps that are configured to be temporarily and removably attached to a panel and frame under construction, for example the aircraft wing panel and frame. Each combination of the air bladder and strap is configured for being positioned extending over the panel between the forward spar of the frame and the rearward spar of the frame with the air bladder and strap positioned over and between adjacent ribs of the frame on the opposite side of the panel. Inflating the air bladders of each combination of the air bladder and strap causes the air bladders to expand and exert a load on the panel which causes the panel to exert a load on the plurality of ribs of the frame. The inflated air bladders press the panel against the ribs of the frame, and index the panel to the ribs of the frame. With the panel held by the plurality of combinations of the air bladder and the strap, permanent fasteners can be inserted into the panel and the plurality of ribs, permanently attaching the panel to the plurality of ribs of the frame. The plurality of combinations of the air bladder and the strap enable the panel to be permanently fastened to the plurality of ribs of the frame and eliminate the need for using temporary fasteners to attach the panel to the plurality of ribs of the frame.

The features, functions, and advantages that have been discussed can be achieved independently in various embodiments or may be combined in yet other embodiments, further details of which can be seen with reference to the following description and drawings.

DETAILED DESCRIPTION

As stated earlier, the apparatus of this disclosure and its method of use provides a preload for the assembly of large structures and eliminates the extensive costs, labor, and time associated with the installation, removal, and debris associated with using temporary fasteners in the manufacture of large structures, for example aircraft wing structures.

Figure 1:
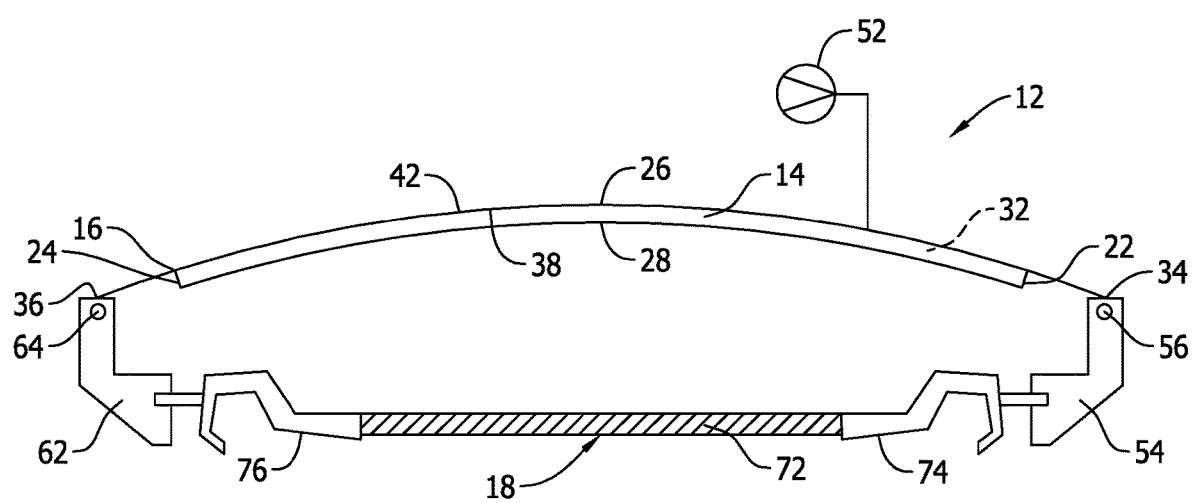
FIG. 1 is a schematic representation of a side elevation view of the apparatus of this disclosure.

FIG. 1 is a schematic representation of a side elevation view of the apparatus 12. The apparatus 12 is basically comprised of a bladder such as an air bladder 14, a strap 16 and a tensioning device 18.

The air bladder 14 has a length with a forward end 22 and a rearward end 24 opposite the forward end. The air bladder 14 has an outer exterior surface 26 that opposes the strap 16, and an opposite, inner exterior surface 28. The air bladder 14 is constructed of any flexible, expandable material that provides a sealed interior volume 32 of the bladder.

Figure 2:
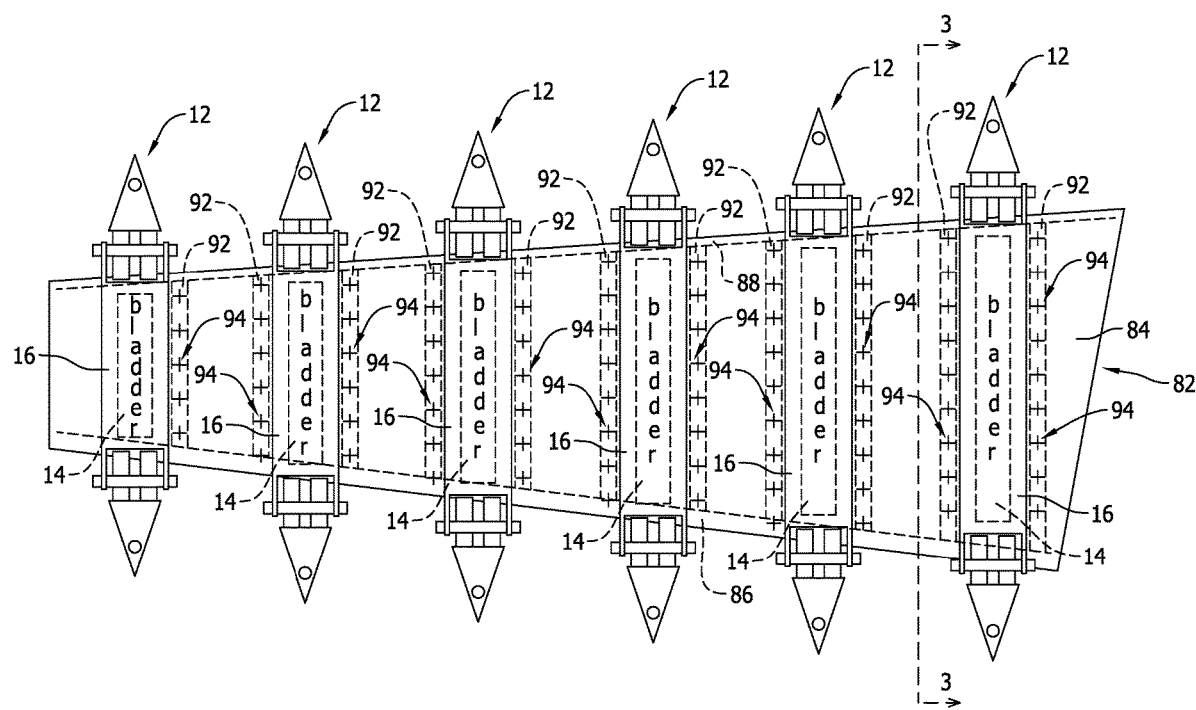
FIG. 2 is a schematic representation of a top plan view of an aircraft wing with several of the apparatus attached over a top panel of the aircraft wing.

The strap 16 has a length with a forward end 34 and a rearward end 36 opposite the forward end. As represented in FIG. 1, the length of the strap 16 is larger than the length of the air bladder 14 with the forward end 34 of the strap extending beyond the forward end 22 of the air bladder 14, and the rearward end 36 of the strap extending beyond the rearward end 24 of the air bladder. As represented in FIG. 2, the width of the strap 16 is larger than the width of the air bladder 14. The strap 16 has an inner exterior surface 38 that opposes the air bladder 14 and an opposite outer exterior surface 42. The strap 16 can be constructed of any material that is flexible and does not stretch when the material is subjected to tensile forces, for example Spectra® fiber, or other equivalent material. Alternatively, the strap 16 could be a rigid structure constructed of a metal such as steel, aluminum, etc., and hoisted and craned with the attached bladder 14 into position against an aircraft wing panel in use, as will be explained.

The inner exterior surface 38 of the strap 16 is operatively secured to the outer exterior surface 26 of the air bladder 14. The inner exterior surface 38 of the strap 16 is secured to the outer exterior surface 26 of the air bladder 14 in such a manner that the strap 16 does not interfere with the expansion and contraction of the air bladder 14. By the inner exterior surface 38 of the strap 16 being operatively secured to the outer exterior surface 26 of the air bladder 14, the inner exterior surface 38 of the strap 16 could be directly connected to the outer exterior surface 26 of the air bladder 14, or indirectly connected to the outer exterior surface 26 of the air bladder 14.

A pump, such as an air pump 52 operatively communicates with the interior volume 32 of the air bladder 14. The air pump 52 is selectively operable to pump air into the interior volume 32 of the air bladder 14, and to vent air from the interior volume 32 of the air bladder 14. The air pump 52 is operable to provide approximately 3 PSI to the interior volume 32 of the air bladder 14.

A forward clamp 54 is attached to the forward end 34 of the strap 16. The attachment of the forward clamp 54 to the forward end 34 of the strap 16 enables the forward clamp 54 to pivot about a pivot pin 56 relative to the forward end 34 of the strap 16. The forward clamp 54 is configured for removable attachment to a first longitudinal beam of a frame, or to a forward spar of a frame, and thereby removably attach the forward end 34 of the strap 16 to the first longitudinal beam or forward spar of the frame.

A rearward clamp 62 is attached to the rearward end 36 of the strap 16. The attachment of the rearward clamp 62 to the rearward end 36 of the strap 16 enables the rearward clamp 62 to pivot about a pivot pin 64 relative to the rearward end 36 of the strap 16. The rearward clamp 62 is configured for removable attachment to a second longitudinal beam, or to a rearward spar of a frame, and thereby removably attach the rearward end 36 of the strap 16 to the second longitudinal beam or rearward spar of the frame.

The tensioning device 18 has an intermediate portion 72 that is selectively adjustable in length. The intermediate portion 72 can be adjusted to decrease the length of the intermediate portion 72, and to increase the length of the intermediate portion 72.

A forward clasp 74 is provided at a forward end of the intermediate portion 72 of the tensioning device 18. The forward clasp 74 is operable to removably attach the intermediate portion 72 of the tensioning device 18 to the forward clamp 54.

A rearward clasp 76 is provided at a rearward end of the intermediate portion 72 of the tensioning device 18. The rearward clasp 76 is operable to removably attach the intermediate portion 72 of the tensioning device 18 to the rearward clamp 62.

FIGS. 2-6 are representations of the method of using the apparatus 12 of FIG. 1 to provide a preload for the assembly of a large structure such as an aircraft wing structure 82.

In FIG. 2, there is represented an aircraft wing panel or a panel 84 of an aircraft wing structure 82 that is to be pre-loaded before its attachment by permanent fasteners to an aircraft wing frame or frame. The panel 84 and the frame can be constructed of composite materials, metal or any other equivalent material used in the construction of aircraft. The frame is comprised of a first longitudinal beam or forward spar 86, a second longitudinal beam or rearward spar 88, and a plurality of lateral beams or ribs 92. The first longitudinal beam or forward spar 86 extends along the longitudinal length of the frame of the aircraft wing structure 82. The second longitudinal beam or rearward spar 88 extends along the length of the frame of the aircraft wing structure 82. The lateral beams or ribs 92 extend across the width of the frame of the aircraft wing structure 82. The plurality of ribs 92 of the frame are attached between the forward spar 86 and the rearward spar 88. The panel 84 is positioned on top of the plurality of ribs 92. A plurality of the combinations of the air bladders 14 and straps 16 is positioned on the panel 84 to preload the panel prior to the panel being attached by permanent fasteners to the aircraft wing frame comprised of the forward spar 86, the rearward spar 88 and the plurality of ribs 92.

Figure 3:
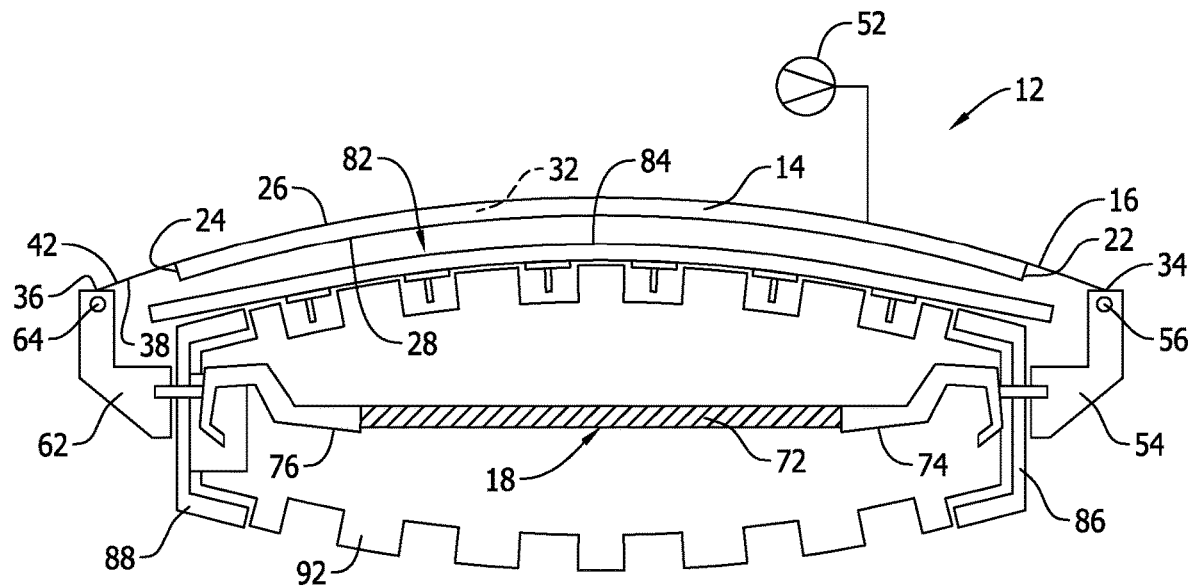
FIG. 3 is a schematic representation of a cross-section view of the aircraft wing of FIG. 2 along the line 3-3 of FIG. 2, with the apparatus of this disclosure attached to the wing frame and extending over the top panel.

FIG. 3 is a schematic representation of a side elevation view of one of the plurality of combinations of the air bladder 14 and the strap 16 of the apparatus 12 viewed in a plane along the line 3-3 of FIG. 2. As viewed in FIG. 3, the forward end 34 of the strap 16 is removably attached to the forward spar 86 of the frame by the forward clamp 54 being removably attached to the forward spar 86. The rearward end 36 of the strap 16 is removably attached to the rearward spar 88 of the frame by the rearward clamp 62 being removably attached to the rearward spar 88. With the forward clamp 54 attached to the forward spar 86 and the rearward clamp 62 attached to the rearward spar 88, the strap 16 extends across the panel 84 positioned on the plurality of ribs 92 of the frame. The air bladder 14 secured to the strap 16 also extends across the panel 84 positioned on the plurality of ribs 92 of the frame with the air bladder 14 positioned between the strap 16 and the panel 84.

The tensioning device 18 is removably attached between the forward clamp 54 and the rearward clamp 62 in the interior of the frame between adjacent ribs of the plurality of ribs 92. The forward clasp 74 is removably attached to the forward clamp 54 and the rearward clasp 76 is removably attached to the rearward clamp 62. The intermediate portion 72 of the tensioning device 18 is selectively operated to reduce the length of the intermediate portion 72 and exert a tensile force between the forward clamp 54 and the rearward clamp 62. The tensile force between the forward clamp 54 and the rearward clamp 62 causes the forward clamp 54 and the rearward clamp 62 to exert tensile forces on the forward end 34 of the strap 16 and on the rearward end 36 of the strap 16, respectively. The tensile forces exerted on the forward end 34 of the strap 16 and the rearward end 36 of the strap 16 pull the strap 16 down toward the air bladder 14 and toward the panel 84 and causes the strap 16 to urge the air bladder 14 against the panel 84.

Figure 4:
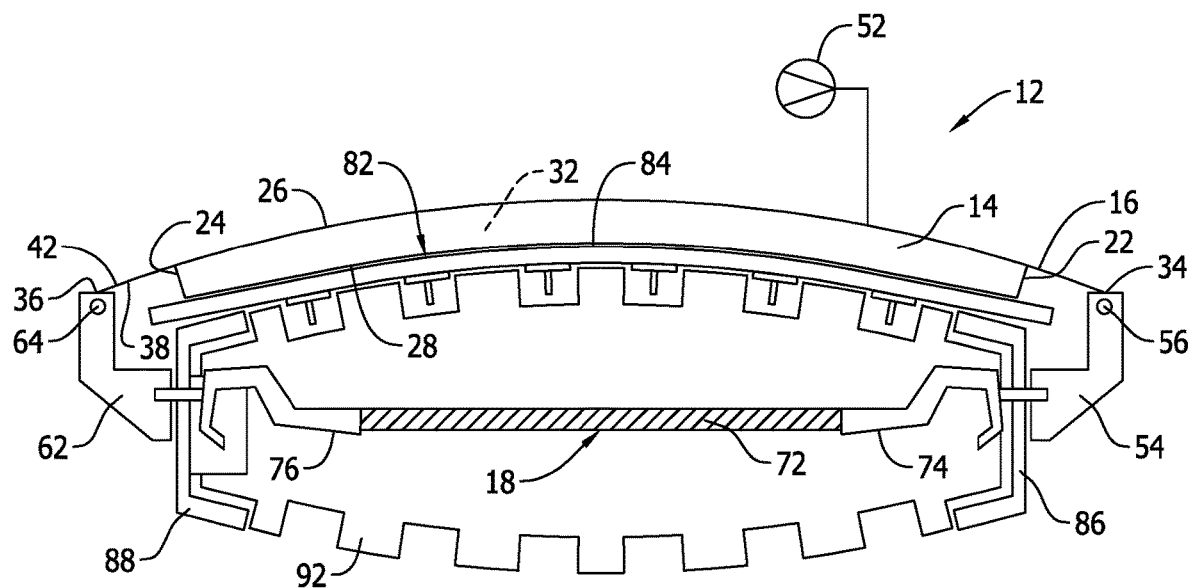
FIG. 4 is a schematic representation of the cross-section view of the aircraft wing of FIG. 3, with the bladder of the apparatus inflated and expanded.

With the air bladder 14 held across the panel 84 by the strap 16, the air pump 52 is operated to deliver air under pressure to the air bladder 14 and inflate the air bladder 14. This is represented in FIG. 4. As the air bladder 14 is inflated, the air bladder 14 expands, exerting a preload or load on the panel 84. The load exerted on the panel 84 by the expanding air bladder 14 causes the panel 84 to exert a load on the ribs 92. The flexibility of the air bladder 14 enables the air bladder 14 to conform to the geometry variations of the portion of the panel 84 across which the air bladder 14 engages. Additionally, as represented in FIGS. 2 and 4, the positioning of the apparatus 12 across the aircraft wing structure 82 represented in FIG. 2 and the positioning of the expanded air bladder 14 against the panel 84 represented in FIG. 4 provides clearance above each air bladder 14 and between adjacent air bladders 14 for the automated installation of permanent fasteners.

Figure 5:
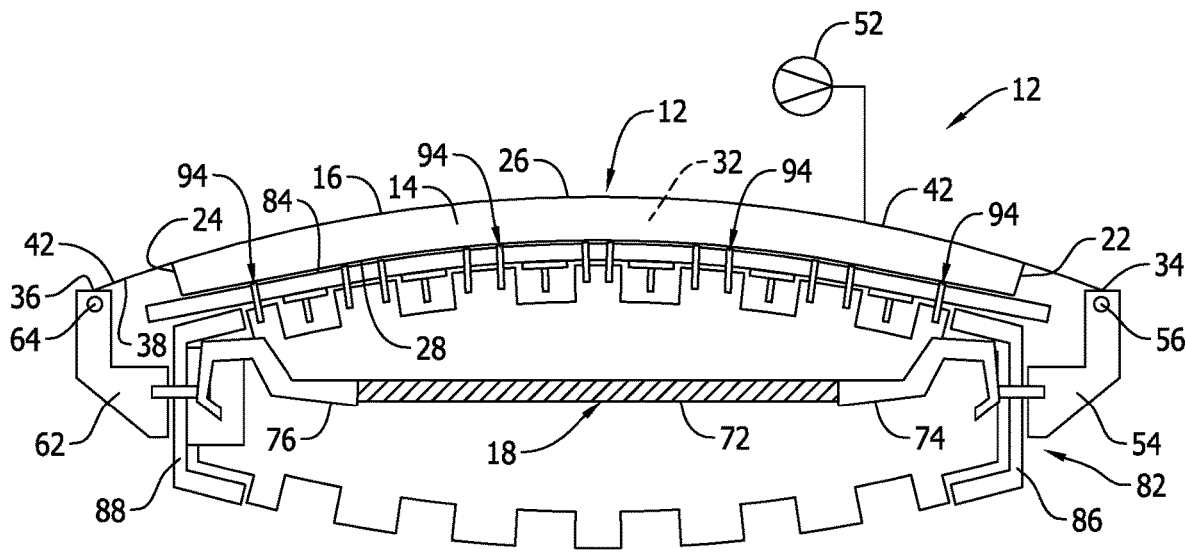
FIG. 5 is a schematic representation of the cross-section view of the aircraft wing of FIG. 3, with fasteners installed in securing the top panel to a rib of the frame.

With the panel 84 being loaded against the plurality of ribs 92, holes for permanent fasteners are drilled through the panel 84 and the plurality of ribs 92 and permanent fasteners 94 are installed securing the panel 84 to the plurality of ribs 92, the forward spar 86 and the rearward spar 88. This is represented in FIGS. 2 and 5.

Figure 6:
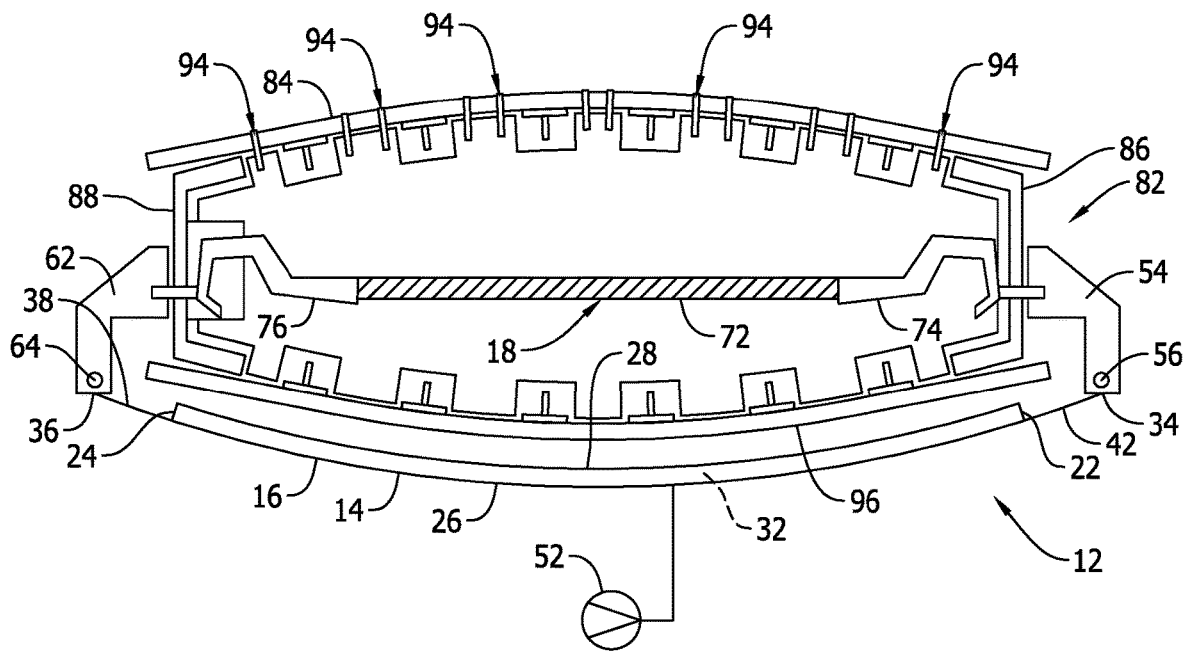
FIG. 6 is a schematic representation of the cross-section view of the aircraft wing of FIG. 3, with the apparatus removed from over the top panel and the apparatus moved to a position extending across the bottom panel of the aircraft wing and attached to the wing frame across the bottom panel.

With permanent fasteners 94 securing the panel 84 to the plurality of ribs 92 and to the forward spar 86 and the rearward spar 88, the apparatus 12 are removed from their attached positions over the panel 84 represented in FIG. 2. The apparatus 12 are then moved to beneath a bottom panel 96 of the aircraft wing structure 82 as represented in FIG. 6. The apparatus 12 are then used according to the same method of attaching the top panel 84 to the plurality of ribs 92 and the forward spar 86 and the rearward spar 88, to attach the bottom panel 96 to the plurality of ribs 92 and the forward spar 86 and the rearward spar 88.

In the manner discussed above, the apparatus 12 and their method of use index an aircraft wing panel to an aircraft wing frame and preload the panel to the frame, enabling the panel to be secured to the frame by the installation of permanent fasteners without the use of temporary fasteners.

Although the apparatus 12 and its method of use are described herein as preloading an aircraft wing panel 84 against a frame of an aircraft wing comprised of a forward spar 86, a rearward spar 88 and a plurality of ribs 92 connected between the forward spar 86 and the rearward spar 88, the apparatus may be employed in preloading any other type of panel to a frame against which the panel engages. The apparatus and its method of use should not be interpreted as limited to preloading an aircraft wing panel against an aircraft wing frame.

As various modifications could be made in the construction of the apparatus and the method of operation of the apparatus herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An apparatus for preloading a panel for attachment of the panel to a frame, the apparatus comprising:
    an elongated bladder;
    an elongated strap, wherein a longitudinal length of the strap is aligned with and extends along a longitudinal length of the bladder, wherein the strap is capable of attachment to a first longitudinal beam of the frame and attachment to a second longitudinal beam of the frame, and wherein the strap is capable of extending across the panel positioned on a plurality of lateral beams of the frame that extend between the first longitudinal beam of the frame and the second longitudinal beam of the frame; and
    a pump operatively communicating with the bladder;
    wherein the pump is capable of delivering fluid to the bladder, expanding the bladder between the strap and the panel, and causing the bladder to operatively engage against and exert a load upon the panel positioned on the plurality of lateral beams of the frame.

2. The apparatus of claim 1, further comprising:
    the pump being capable of delivering fluid to the bladder and expanding the bladder between the strap and the panel causing the bladder to exert a load on the panel positioned on the plurality of lateral beams of the frame and causing the panel to exert a load on the plurality of lateral beams of the frame and the first longitudinal beam of the frame and the second longitudinal beam of the frame.

3. The apparatus of claim 1, further comprising:
the bladder being operatively secured to the strap.

4. The apparatus of claim 3, further comprising:
the strap having a forward end and a rearward end opposite the forward end; and,
a forward clamp secured to the forward end of the strap, the forward clamp being operable to removably attach the forward end of the strap to the first longitudinal beam of the frame.

5. The apparatus of claim 4, further comprising:
a rearward clamp secured to the rearward end of the strap, the rearward clamp being operable to removably attach the rearward end of the strap to the second longitudinal beam of the frame.

6. The apparatus of claim 5, further comprising:
a tensioning device that is removably attachable to the forward clamp and the rearward clamp, the tensioning device being operable to exert a tensile force between the forward clamp and the rearward clamp that is transferred by the forward clamp and the rearward clamp to the forward end of the strap and the rearward end of the strap, respectively.

7. The apparatus of claim 1, further comprising:
a plurality of combinations of the bladder and the strap, wherein the bladder and the strap being one combination of the bladder and the strap of the plurality of combinations of the bladder and the strap, each combination of the bladder and the strap being configured to be positioned extending across the panel between pairs of adjacent lateral beams.

8. The apparatus of claim 1, further comprising:
the frame being an aircraft wing frame, the first longitudinal beam of the frame being a forward spar of the frame, the second longitudinal beam of the frame being a rearward spar of the frame, and the plurality of lateral beams of the frame being a plurality of ribs of the frame.

9. An apparatus for preloading a panel for attachment of the panel to a frame, the apparatus comprising:
an elongated air bladder;
an elongated strap, the air bladder being operatively secured to the strap, wherein a longitudinal length of the strap is aligned with and extends along a longitudinal length of the bladder, wherein the strap is capable of attachment to a forward spar of the frame and attachment to a rearward spar of the frame, wherein the strap is capable of extending across the panel positioned on a plurality of ribs of the frame that are attached between the forward spar of the frame and the rearward spar of the frame; and
an air pump operatively communicating with the air bladder;
wherein the air pump when activated is capable of delivering air to the air bladder, inflating the air bladder, causing the air bladder to expand between the strap and the panel, and causing the air bladder to operatively engage against and exert a load on the panel positioned on the plurality of ribs of the frame causing the panel to exert a load on the ribs of the frame and on the forward spar of the frame and on the rearward spar of the frame.

10. The apparatus of claim 9, further comprising:
the strap having a forward end and a rearward end opposite the forward end; and,
a forward clamp operatively connected to the forward end of the strap, the forward clamp being removably attachable to the forward spar of the frame to removably attach the forward end of the strap to the forward spar of the frame.

11. The apparatus of claim 10, further comprising:
a rearward clamp operatively connected to the rearward end of the strap, the rearward clamp being removably attachable to the rearward spar of the frame to removably attach the rearward end of the strap to the rearward spar of the frame.

12. The apparatus of claim 11, further comprising:
a tensioning device having a length between a forward end of the tensioning device and a rearward end of the tensioning device, the forward end of the tensioning device being removably attachable to the forward clamp and the rearward end of the tensioning device being removably attachable to the rearward clamp, the tensioning device being operable to selectively reduce the length of the tensioning device causing the tensioning device to exert a tensile force between the forward clamp and the rearward clamp with the tensile force being transferred by the forward clamp to the forward end of the strap and the tensile force to be transferred by the rearward clamp to the rearward end of the strap.

13. The apparatus of claim 9, further comprising:
a plurality of combinations of the air bladder and the strap, wherein the air bladder and the strap being one combination of the air bladder and the strap of the plurality of combinations of the air bladder and the strap, each combination of the air bladder and the strap of the plurality of combinations of the air bladder and the strap being configured for being positioned extending across the panel between the forward spar of the frame and the rearward spar of the frame and between adjacent ribs of the frame.

14. The apparatus of claim 9, further comprising:
the frame being an aircraft wing frame comprised of the forward spar extending along a length of the aircraft wing frame, the rearward spar extending along the length of the aircraft wing frame, and the plurality of ribs extending across a width of the aircraft wing frame.

15. A method of preloading a panel on a frame for attachment of the panel to the frame, the method comprising:
positioning an elongated air bladder on a panel on the frame;
attaching a forward end of an elongated strap having a longitudinal length that is aligned with and extends along a longitudinal length of the air bladder to a forward spar of the frame and attaching a rearward end of the strap to a rearward spar of the frame; and,
inflating the air bladder causing the air bladder to expand between the strap and the panel and exert a force on the panel that urges the panel against the frame.

16. The method of claim 15, further comprising:
exerting a tensile force on the forward end of the strap and exerting a tensile force on the rearward end of the strap that urge the strap against the air bladder and urge the air bladder against the panel.

17. The method of claim 15, further comprising:
positioning the air bladder on a panel that is an aircraft wing panel; and
the aircraft wing panel being positioned on the frame that is an aircraft wing frame that is comprised of the forward spar and the rearward spar and a plurality of ribs attached between the forward spar and the rearward spar.

18. The method of claim 15, further comprising:

positioning the air bladder on the panel on the frame and the strap that extends over the air bladder as one combination of a plurality of combinations of air bladders and straps, with each air bladder of the combination of air bladders and straps being positioned on the panel on the frame, and each forward end of the straps that extend over the air bladders being attached to the forward spar of the frame and each rearward end of the straps that extend over the air bladders being attached to the rearward spar of the frame; and, inflating each air bladder of the plurality of combinations of air bladders and straps causing the air bladders to expand between the straps and the panel and exert forces on the panel that urge the panel against the frame.

\* \* \* \* \*